D. C. AND W. WISENBERG.
JAR WRENCH.
APPLICATION FILED OCT. 28, 1920.
1,394,388.
Patented Oct. 18, 1921.
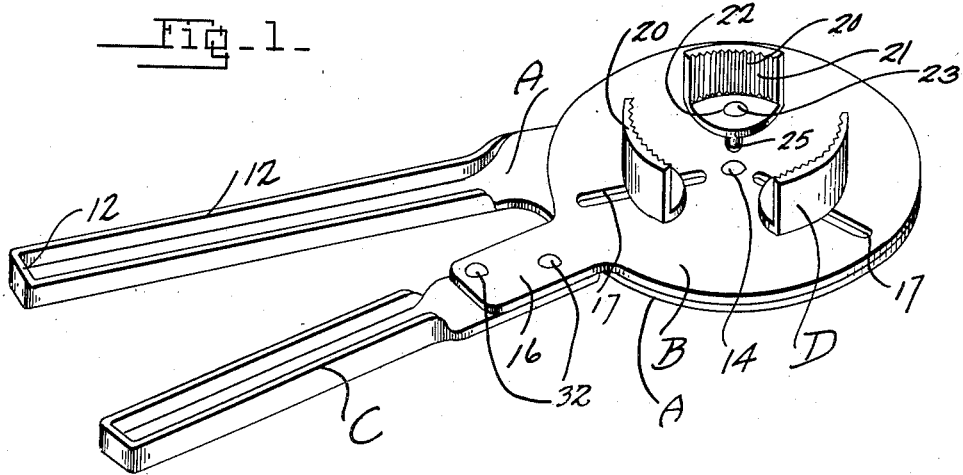
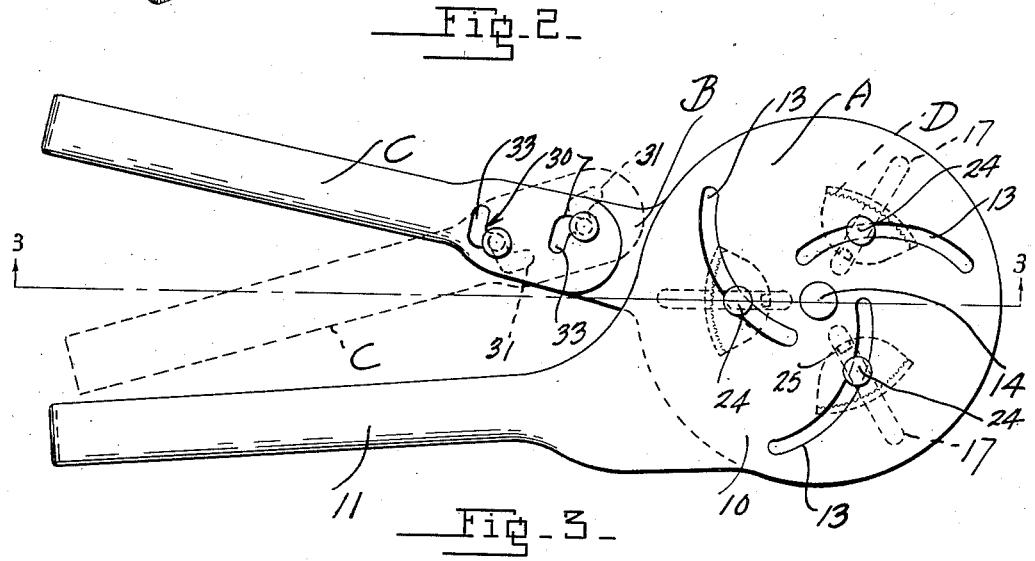
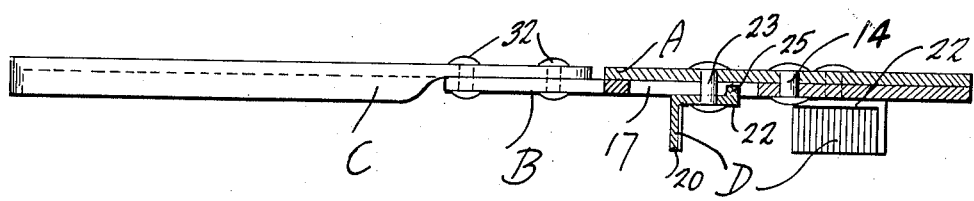
Inventors
Don C. Wisenberg
Wilbur Wisenberg
By Lancaster and Allwine
Attorneys

UNITED STATES PATENT OFFICE.

DON CARLOS WISENBERG AND WILBUR WISENBERG, OF PERU, INDIANA.

JAR-WRENCH.

1,394,388.  Specification of Letters Patent.  Patented Oct. 18, 1921.

Application filed October 28, 1920. Serial No. 420,196.

*To all whom it may concern:*

Be it known that we, DON C. WISENBERG and WILBUR WISENBERG, citizens of the United States, residing at Peru, in the county of Miami and State of Indiana, have invented certain new and useful Improvements in Jar-Wrenches, of which the following is a specification.

This invenion relates to improvements in jar wrenches.

The primary object of the invention is the provision of a jar wrench which is adjustable to receive various sized jar covers to either place the same upon or remove them from a jar.

A further object of the invention is the provision of a jar wrench having an adjustable handle to facilitate manual operation thereof.

A further object of the invention is the provision of a jar wrench having a plurality of clamping jaws adapted to be adjusted with respect to each other by manual operation to grip the covers of various sized jars.

A further object of the invention is the provision of a jar wrench of the above described character, which is simple and durable in construction, and one which evenly distributes an exerted force upon a jar cover to effectively remove the same from a jar.

Other objects and advantages of the invention will be apparent during the course of the following detailed description.

In the accompanying drawings forming a part of this specification and in which like reference characters designate like parts throughout the same, Figure 1 is a perspective view of the top of the improved jar wrench.

Fig. 2 is a plan view showing the bottom construction of the improved jar wrench.

Fig. 3 is a cross sectional view taken on the line 3—3 of Fig. 2.

In the drawings, wherein for the purpose of illustration is shown a preferred embodiment of our invention, the letter A designates a rigid handle and bearing plate construction upon which is pivotally mounted the bearing plate B to which is adjustably mounted a handle structure C. The clamping jaws D are adjustably mounted upon the upper bearing plate B and are provided to engage a jar cover (not shown) for the purpose of removing the same from a jar (not shown).

The bearing plate A comprises the substantially flat circular disk 10 tangentially upon which is formed a handle 11. The handle 11 in order to provide sufficient rigidity to the same is provided with upstanding flanges 12 upon the longitudinal side and free end thereof. The disk portion 10 of the structure A is provided with a series of arcuate slots 13, symmetrically disposed about the rivet 14 which pivotally connects the bearing plates A and B although not struck from the same as a center.

The plate B is of substantially the same formation and construction as the plate A, with the exception that a projection 16 is provided extending from the periphery thereof, and to which is adjustably mounted the handle structure C. The plate B is provided with a plurality of straight slots 17, adapted to co-act with the arcuate slots 13 of the plate A, which, however, are radially disposed upon the plate B from the pivot 14.

The clamping jaws D are provided to be circumferentially placed upon the plate B and each comprise a jar engaging portion 20 which is arcuated, and has its concave surface provided with the serrated or toothed projections 21 which face the pivoted connection 14 of the bearing plates A and B. The clamping jaws D are provided with the bearing plate engaging portions 22 which are provided to straddle the slot 17 and each one of the clamping jaws has a rivet 23 projecting downwardly from the bearing plate engaging portion 22 and through the slot 17 to project through a companion slot 13 in the bearing plate construction A. A head 24 is formed upon each of the projecting rivets 23 adjacent each of the cam slots 13 and which are provided to prevent disconnection of the clamping jaws from the bearing plates A and B. In order to insure that the facing concaved portions 21 will at all times be presented to the pivotal connection 14 of the bearing plates A and B, a projection 25 is formed upon the forward end of the plate engaging portions 22 and which depends into the slot 17 to prevent rotation of the clamping jaws D upon the rivet 23 as a center.

In operation, the device is placed upon a jar cover so that the portions 20 of the clamping jaws D engage the jar cover, and the handles of the device are manually pressed toward one another by one hand of the operator. Since each one of the slots 17 has a companion cam slot 13 which intersects at some one point the straight slot 17 and which point of intersection has the rivet 23 of the clamping jaw D disposed therein, it follows that as the disk A and disk B are rotated upon each other, in order that the clamping jaws will grip a jar cover, the inside surfaces of the slots 13 will act as cam surfaces against the projecting rivets 23 of the clamping jaws D, and consequently sliding them forward in the slot 17, moving the clamping jaws D toward the pivot 14. The operator can continue the pressing action upon the handles until a secure grip is effected upon the jar cover and the same can either be placed upon a jar or removed from the same as desired. No breaking of the jar or rupture to the jar cover will result since upon application of pressure thereupon each one of the clamping jaws D exerts an equal force on the jar cover, due to the symmetrical disposition of the jaws D upon the disk B.

Since a relatively wide range of adjustment of the clamping jaws D is desired, it is preferred that one of the handles C be made adjustable, in order to facilitate the gripping action by the operator of the device.

The handle C is therefore provided with right angled slots 30 which are provided with a slotted portion 31 running parallel with the longitudinal run of the handle C and into which rivets 32 which are securely mounted to the projection 16 of the bearing plate B are slidably mounted, and engage therein for adjustment of the clamping jaws D upon a jar cover of relatively small diameter. However, the slotted portions 33 are provided in the handle structure C and communicating with the slotted portions 31 and at right angles thereto which are provided in order that the handle C can be adjusted upon the projection 16 so that the rivets 32 lie in the slots 33 and the handle structure C can be bent toward the handle 12 of the bearing plate 10 in order to facilitate the gripping by an operator when it is desired to engage a jar cover of relatively large diameter. When the rivets 32 are disposed within the slotted section 31, of course, the handle C can be pressed toward the handle 12 without any resulting lateral movement of the handle C with respect to the projection 16, and likewise when the handle structure C is moved or pushed toward the center rivet 14, in such manner that the rivets 32 can be disposed within the slotted section 33 of the handle section C, the handle section can be bent to assume a position as shown by the dotted line in Fig. 2 of the drawings.

It is to be understood that the form of our invention herewith shown and described is to be taken as a preferred example of the same and that various changes in the shape, size and arrangement of parts may be made without departing from the spirit of the invention or the scope of the subjoined claims.

We claim:

1. In a jar wrench, the combination, of a pair of bearing plates pivotally connected, handles upon said bearing plates, and a plurality of arcuate jaw segments reciprocably engaging said bearing plates, said arcuate portions arranged concentrically of the pivot of said bearing plates, and adapted to advance toward or retract from said pivot upon relative movement of said bearing plates.

2. A jar wrench comprising in combination, a rigid handle, an adjustable handle, clamping jaws slidably carried by said handles, and means for adjustably positioning them with respect to each other upon movement of the handles.

3. A jar wrench comprising in combination, a pair of handles having substantially flat bearing plates upon one end of each, and pivotally connected therethrough, clamping jaws adjustably carried by said bearing plates, said clamping jaws adapted to assume various positions with respect to each other upon movement of the handles.

4. A jar wrench comprising in combination, a pair of handles, bearing plates upon the ends of said handles, and pivotally connected to each other, said plates each having a plurality of slots therein adapted for coaction, a plurality of clamping jaws disposed within said slots, the slots of one plate so disposed with respect to the other plate's slots that upon movement of the handles about the plate pivot, the slots will adjust the positions of the clamping jaws.

5. A jar wrench comprising in combination, a pair of pivotally connected bearing plates, handles connected to said bearing plates for adjusting the positions of said bearing plates with respect to each other, clamping jaws disposed upon said bearing plates, each comprising an arcuate jar cover engaging portion, and a bearing plate engaging portion, said clamping jaws adapted to move to or away from the pivot connection of said bearing plate upon movement of the handles.

6. A jar wrench comprising in combination a pair of bearing plates pivotally connected to each other, each of said bearing plates having slots therein, clamping jaws comprising an upstanding arcuate portion, and a bearing plate engaging portion, and a projection portion disposed in said slots; handles carried by said bearing plates and adapted for adjustment to move the clamping jaws to or away from the pivot connection of the bearing plates, said clamping jaws having their arcuate portions always in a fixed facing position with respect to said bearing plate pivot.

7. A jar device comprising in combination a pair of pivotally connected disks, each of said disks having slots therein, each of the slots in a disk, intersecting with companion slots in the other of said disks, to provide intersecting openings, jaws slidably mounted on said disks, each having a projection through one of said openings provided by intersecting slots, and means for relative movement of said disks to advance or retract the jaw elements.

8. A jar wrench comprising in combination, a pair of bearing plates, a handle rigidly positioned upon one of said bearing plates, the other of said bearing plates having a projection thereon, an adjustable handle having slots therein adapted to engage said projection portion of said second mentioned bearing plate and adapted to be adjusted with respect to said first mentioned handle, and adjustable jaws carried by said bearing plates.

9. A jar wrench comprising in combination, a pair of bearing plates, each having a plurality of slots therein adapted to coact with each other, the slots of one bearing plate adapted to overlie the slots of the other bearing plate, to provide an aperture, clamping jaws having a projection thereon adapted for insertion through said aperture, and handles positioned upon said bearing plates and upon movement of each other to adjust the position of said clamping jaws to or from the pivoted connection of said bearing plates, by the cam action of the inside surfaces of said slots upon the clamping jaw projection.

10. In a jar wrench, the combination, of a pair of bearing plates, one of said plates having curved slots therein, and the other of said plates having straight slots therein, said plates being pivoted together and having the curved slots so disposed about the pivot of the bearing plates and the straight slots radially extending from the pivot as to provide an intersecting of each one of the curved slots with one of the straight slots upon the other plate, to provide an aperture, clamping jaws having a projection adapted for insertion in apertures provided by the slots in the bearing plates, and handles upon said bearing plates adapting them for pivotal movement in order to move the clamping jaws to or from the pivoted connection of said bearing plates.

11. A jar wrench, comprising in combination, a pair of bearing plates, there being curved slots in one of said bearing plates and straight slots in the other of said bearing plates radiating from the pivotal connection of the said bearing plates, a plurality of clamping jaws, each of said clamping jaws comprising a jar cover engaging portion and a bearing plate abutting portion, each of said clamping jaws provided with a projecting portion adapted for insertion through one of the straight slots in one of the bearing plates and through a curved slot in the other of said bearing plates, handles connected to each of said bearing plates, one of said handles being adjustable toward the other, said handles when moved toward each other to move the bearing plates adapted to have the slots in the bearing plates thereof act as cams for moving the clamping jaws to and from the pivot connection of the bearing plates.

DON CARLOS WISENBERG.
WILBUR WISENBERG.